United States Patent
Vinati et al.

(10) Patent No.: US 7,039,945 B2
(45) Date of Patent: May 2, 2006

(54) METHOD AND DEVICE FOR CONTROLLING THE TIME WHICH A USER SPENDS CONNECTED TO A DATA COMMUNICATION NETWORK

(75) Inventors: Felice Vinati, Villa Carcina (IT); Samuele Vinati, Brescia (IT); Matteo Vinati, Castegnato (IT)

(73) Assignee: Gestweb S.p.A., (IT)

( * ) Notice: Subject to any disclaimer, the term of this patent is extended or adjusted under 35 U.S.C. 154(b) by 766 days.

(21) Appl. No.: 09/880,140

(22) Filed: Jun. 14, 2001

(65) Prior Publication Data

US 2002/0099836 A1 Jul. 25, 2002

(30) Foreign Application Priority Data

Jan. 22, 2001 (IT) ........................... MI2001A0113

(51) Int. Cl.
*G06F 7/04* (2006.01)
(52) U.S. Cl. .................. 726/2; 726/3; 726/5; 726/7
(58) Field of Classification Search ........ 713/200–202, 713/176; 709/229, 200, 217, 219, 223–225; 726/1–8
See application file for complete search history.

(56) References Cited

U.S. PATENT DOCUMENTS

| | | | |
|---|---|---|---|
| 5,889,958 A | 3/1999 | Willens | |
| 5,987,611 A | 11/1999 | Freund | |
| 6,216,228 B1 * | 4/2001 | Chapman et al. | 713/176 |
| 6,256,739 B1 * | 7/2001 | Skopp et al. | 713/201 |
| 6,279,112 B1 * | 8/2001 | O'Toole et al. | 713/201 |
| 6,615,263 B1 * | 9/2003 | Dulai et al. | 709/225 |
| 6,704,787 B1 * | 3/2004 | Umbreit | 709/229 |
| 6,738,901 B1 * | 5/2004 | Boyles et al. | 713/159 |

FOREIGN PATENT DOCUMENTS

WO    00 67096    11/2000

\* cited by examiner

*Primary Examiner*—Hosuk Song
(74) *Attorney, Agent, or Firm*—Ostrolenk, Faber, Gerb, & Soffen, LLP

(57) ABSTRACT

A method for controlling the time which a user spends connected to a data communication network, comprising the steps of:
 upon connection of a user to a data communication network, determining a profile of the user by determining the age group to which the user belongs;
 calculating a time that the user has spent connected to the data communication network and comparing the connection time with a table which contains connection times which are predefined according to the different age groups of the user;
 if the connection time is greater than the maximum allowable time for the age group of the user, automatically interrupting the connection to the data communication network.

8 Claims, 3 Drawing Sheets

| AGE GROUP | DAILY CONTINUOUS CONNECTION TIME $Tefc <=$ MAX MIN. | ACTUAL DURATION OF INDIVIDUAL CONNECTIONS $Tefc$ MIN. | RESTING TIME PERCENTAGE VARIABLE $\%Tefc$ | SUM OF INDIVIDUAL CONNECTION TIMES $\sum Tefc <=$ MAX MIN. |
|---|---|---|---|---|
| Up to 9 | 90 | 9<br>18<br>27<br>36<br>45<br>54<br>63<br>72 | 50%<br>60%<br>65%<br>70%<br>150%<br>200%<br>300%<br>12 hours | 180 |
| 9-11 | 100 | 10<br>20<br>30<br>40<br>50<br>60<br>70<br>80 | 50%<br>60%<br>65%<br>70%<br>150%<br>200%<br>300%<br>12 hours | 200 |
| 12-13 | 110 | 11<br>22<br>33<br>44<br>55<br>66<br>77<br>88 | 50%<br>60%<br>65%<br>70%<br>150%<br>200%<br>300%<br>12 hours | 220 |
| 14-15 | 140 | 14<br>28<br>42<br>56<br>70<br>84<br>98<br>112 | 50%<br>60%<br>65%<br>70%<br>150%<br>200%<br>300%<br>12 hours | 280 |
| 16-17 | 180 | 18<br>36<br>54<br>72<br>90<br>108<br>126<br>144 | 50%<br>60%<br>65%<br>70%<br>150%<br>200%<br>300%<br>12 hours | 360 |

METHOD AND DEVICE FOR CONTROLLING THE TIME WHICH A USER SPENDS CONNECTED TO A DATA COMMUNICATION NETWORK

BACKGROUND OF THE INVENTION

The present invention relates to a method and a device for controlling the time spent accessing a data communication network.

It is known that the increasing growth of data communication networks, such as the Internet, has caused a very large number of users to generally go online.

On the other hand, the increasing growth of the data communication network has caused information of various kinds to be posted online, with a consequent proliferation of sites which contain data and information, as well as images, videos and the like, whose viewing should be reserved exclusively to adult users.

Co-pending Italian patent application no. MI2000A 002189 by the same Applicant discloses a method for controlling access to a data communication network which allows in particular to check whether the user who wishes to connect to the data communication network is an adult or a minor by comparing his data so as to define a user profile.

If the user is an adult, the method allows free access to the network; otherwise it forces a controlled navigation.

However, the above cited patent application, while constituting a considerable step forward for protecting minors who access the data communication network, does not solve the problem of the duration of the connection that the user can establish with the data communication network.

In particular, this requirement is felt for both adult and minor users.

It is in fact known that a long permanence in front of the screen, particularly during a connection to the Internet, can lead to traumatic consequences, such as epileptic conditions, catalepsy, et cetera.

SUMMARY OF THE INVENTION

The aim of the present invention is to provide a method for controlling the time spent connected to a data communication network which allows to protect the health of users by predefining a maximum allowed time.

Within this aim, an object of the present invention is to provide a method for controlling the time spent connected to a data communication network which allows to determine a maximum allowable time according to the profile of the user who is connected to the data communication network.

Another object of the present invention is to provide a method for controlling the time spent connected to a data communication network which can also be used for video games or other application programs. Another object of the present invention is to provide a method for controlling the time spent connected to a data communication network which is highly reliable, relatively simple to provide, and has modest costs.

This aim and these and other objects which will become better apparent hereinafter are achieved by a method for controlling the time which a user spends connected to a data communication network, characterized in that it comprises the steps of:

upon connection of a user to a data communication network, determining the profile of the user by determining the age group to which he belongs;

calculating the time that said user has spent connected to the data communication network and comparing said connection time with a table which contains connection times which are predefined according to the different age groups of the user;

if such connection time is greater than a maximum allowable time for the age group of said user, automatically interrupting the connection to said data communication network.

BRIEF DESCRIPTION OF THE DRAWINGS

Further characteristics and advantages of the invention will become better apparent from the description of a preferred but not exclusive embodiment of the control method and of the corresponding device according to the present invention, illustrated only by way of non-limitative example in the accompanying drawings, wherein:

FIG. 3 is a table which shows an example of predefined connection times in relation to different user age groups.

DESCRIPTION OF THE PREFERRED EMBODIMENTS

Figure 1:
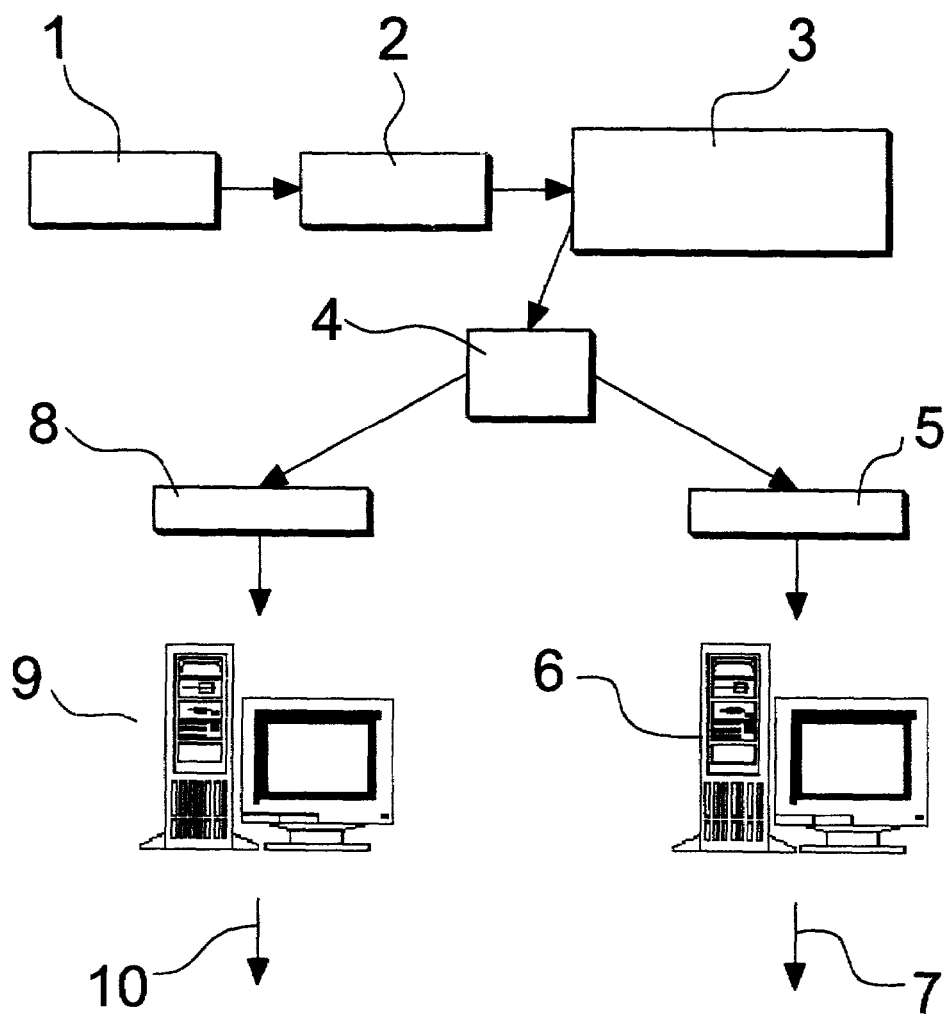
FIG. 1 is a block diagram of the method for the connection of a user to a data communication network, according to the present invention.

With reference to the figures, the method according to the invention is as follows.

The user, generally designated by the reference numeral 1, upon requesting connection to a data communication network by dialling through his computer the telephone number of a service provider 2 with which he has prearranged an appropriate service contract, is identified by being asked a password and a user identification word.

The identification step is generally designated by the reference numeral 3.

At this point, the identification procedure verifies, by accessing a database 4, the information received from the user connected to the service provider 2 and identifies the profile of that user, discriminating whether the user is an adult or a minor and, in the latter case, the age group to which the user belongs.

The identification procedure consequently proceeds in two different modes: if the user profile corresponds to an adult, step 5, and therefore has no restrictions to navigation on the network, access by means of the computer of the user 6 is unrestricted. In this case, access to the network is designated by the reference numeral 7.

Otherwise, if the user profile corresponds to a minor, step 8, access to the network by means of the computer of the user 9 (who in this case is a minor) occurs in a controlled manner, designated by the reference numeral 10.

Figure 2:
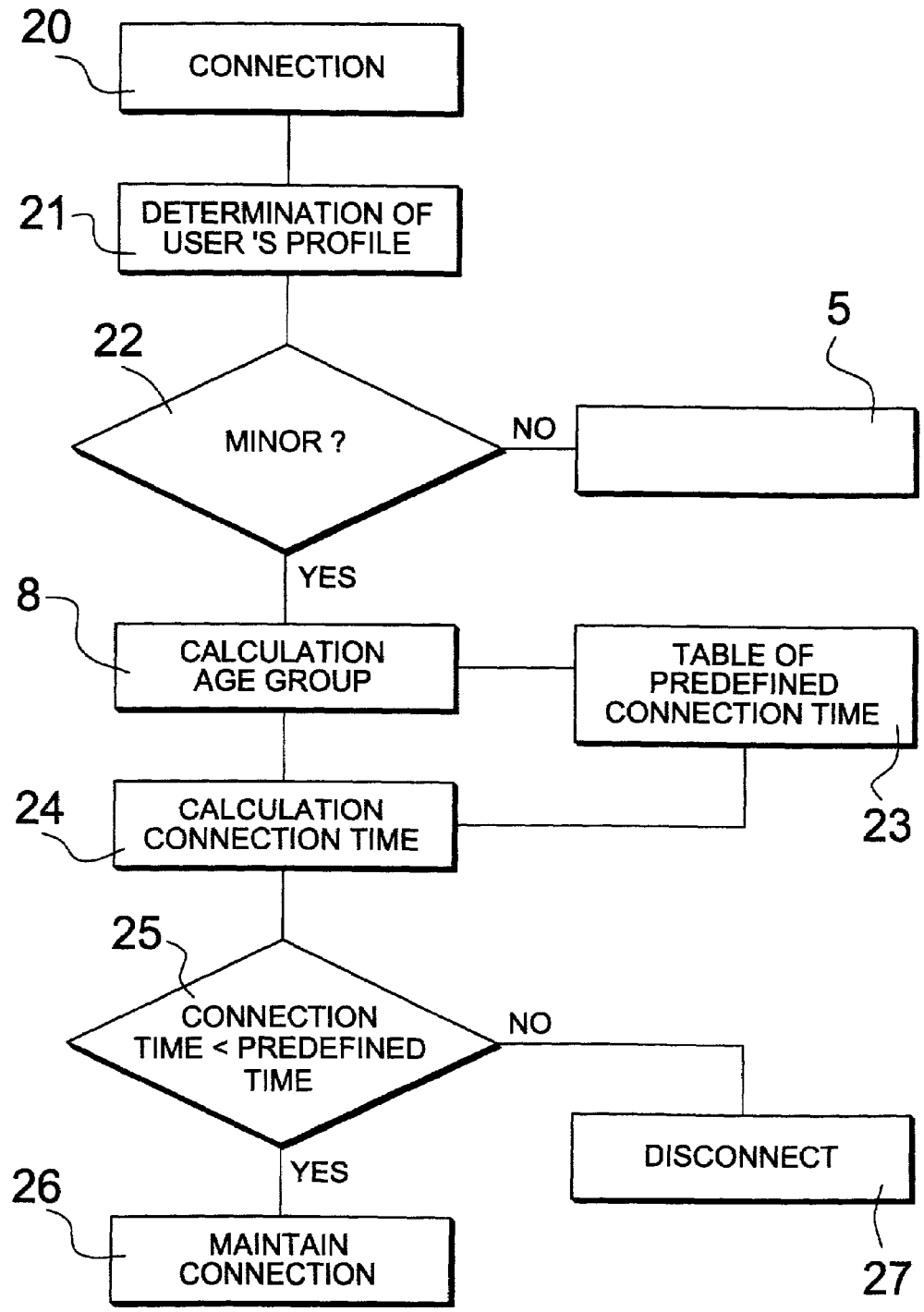
FIG. 2 is a flowchart of the method for controlling the connection time of the user according to the present invention.

FIG. 2 is a detailed flowchart of the procedure.

In particular, a first connection step 20 is followed by a step of determining the user profile 21, which in turn is followed by a step 22 of determining whether the user is a minor or not; if the user is not a minor, the procedure moves on to the step 5, as shown in FIG. 1.

Otherwise, the procedure moves on to the step 8 for determining the age group of the minor.

A search in a table 23 is linked to the step 8; said table predefines, for each age group, the daily continuous connection times, designated by Tefc, the actual duration of the individual connections, designated by Tefc, the resting time percentage variable, designated by % Tefc, and the time variable constituted by the sum of the individual connections.

The table 23 is shown by way of example in FIG. 3.

The procedure continues with a step 24 of calculating the time that the user has spent connected to the Internet and with a step 25 of checking whether the connection time is longer or shorter, depending on the age group identified in table 23, than the connection time predefined in said table.

If the connection time is shorter than the predefined maximum allowable connection time, then the procedure continues with a step 26 in which the connection of the user to the Internet is maintained; otherwise, step 27, an automatic disconnection of the user from the Internet is performed.

If the connections made are shorter, in terms of total duration, than the maximum allowable time, the procedure takes into account the time elapsed between one connection and the next (the resting time), which must not be shorter than the connection that has just ended multiplied by a constant which is preset according to the age group of the user connected to the Internet.

If the resting time is coherent or compliant, the subsequent connection is authorized and in any case the total of daily continuous connections cannot exceed a given number of minutes for each age group.

The table 23 can be preset, for example, by the service provider 2, or the parents of the minor and other people, for example, can be allowed to enter the variables.

In this manner, by being able to set the maximum allowable time for which a user is connected to the Internet, the parents of a minor are not forced to monitor the minor constantly in order to prevent him from remaining connected to the network for too long.

The method according to the invention in fact automatically monitors the connection times and disconnects the user if said connection time has exceeded the predefined maximum limit for the age group to which the user belongs.

On the one hand, this has the advantage of protecting the user's health; on the other, it also has the additional advantage of controlling connection costs even though one cannot be physically present for direct monitoring.

In practice it has been found that the method according to the invention allows to keep track of the connections to the data communication network established by the user, calculating the time of each connection and comparing it with a preset maximum time in order to prevent the user's health from being compromised by excessively long connections.

The device related to the method according to the invention therefore comprises means which are suitable to monitor, after determining the user profile (and therefore the age group of the user), the duration of the connection to the data communication network (for example the Internet) established by the user, means suitable to compare the connection time with a table which contains connection times which are predefined according to different age groups, and means suitable to interrupt the connection to the data communications network if the connection time exceeds the preset maximum time.

The method and the device thus conceived are susceptible of numerous modifications and variations, all of which are within the scope of the inventive concept; all the details may furthermore be replaced with other technically equivalent elements.

The disclosures in Italian Patent Application No. MI2001A000113 from which this application claims priority are incorporated herein by reference.

What is claimed is:

1. A method for controlling the amount of time a user spends connected to a data communication network, the method comprising:
   associating the user with an age group when the user connects to the data communication network;
   calculating a user's connection time that represents at least an amount of time that the user is connected to the data communication network;
   comparing the user's connection time with information which represents appropriate connection times for different age groups;
   automatically interrupting the user's connection to the data communication network when the user's connection time exceeds the appropriate connection time for the user's age group,
   wherein the step of calculating the user's connection time comprises calculating the sum of one or more connections established by the user during a given time interval; and
   further comprising calculating an amount of elapsed time between one of the user's connections to the data communication network and a subsequent connection, and multiplying the amount of elapsed time by a constant according to the age group of said user.

2. The method according to claim 1, further comprising authorizing an additional user connection if the product of the calculated elapsed time and the constant is not less than a duration of the subsequent connection.

3. A method for controlling the amount of time a user spends connected to a data communication network, the method comprising:
   associating the user with an age group when the user connects to the data communication calculating a user's connection time that represents at least an amount of time that the user is connected to the data communication network;
   comparing the user's connection time with information which represents appropriate connection times for different age groups; and
   automatically interrupting the user's connection to the data communication network when the user's connection time exceeds the appropriate connection time for the user's age group,
   wherein the step of automatically interrupting the user's connection further comprises determining whether a sum of durations of connections established by the user during a given time interval exceeds a maximum connection time that is allowable for the user's age group, and further wherein the information representing maximum allowable connection times according to the user's age group is determined in advance by a data communication network service provider.

4. The method according to claim 3, wherein the information representing the maximum allowable connection times according to the user's age group is predefined by the user.

5. A system for controlling the amount of time a user spends connected to a data communication network, the system comprising:
   a user profile that associates the user with an age group;
   a connection module that references the profile when the user connects to the data communication network;

a time calculation module that calculates a user's connection time to represent at least an amount of time that the user is connected to the data communications network;

a comparison module that compares the user's connection time with a database that identifies appropriate connection times for different age groups; and an interruption module that automatically interrupts the user's connection to the data communication network when the user's connection time exceeds the appropriate connection time for the user's age group, wherein the time calculation module calculates the sum of one or more connections established by the user during a given time interval, and further wherein the time calculation module further calculates an amount of elapsed time between one of the user's connections to the data communication network and a subsequent connection, and multiplies the amount of elapsed time by a constant according to the age group of said user.

6. The system according to claim 5, further comprising an authorization module that authorizes an additional user connection if the product of the calculated elapsed time and the constant is not less than a duration of the subsequent connection.

7. A system for controlling the amount of time a user spends connected to a data communication network, the system comprising:

a user profile that associates the user with an age group;

a connection module that references the profile when the user connects to the data communication network;

a time calculation module that calculates a user's connection time to represent at least an amount of time that the user is connected to the data communications network;

a comparison module that compares the user's connection time with a database that identifies appropriate connection times for different age groups; and an interruption module that automatically interrupts the user's connection to the data communication network when the user's connection time exceeds the appropriate connection time for the user's age group.

wherein the interruption module further determines whether a sum of durations of connections established by the user during a given time interval exceeds a maximum connection time that is allowable for the user's age group, and further wherein the maximum connection time according to the user's age group is determined in advance by a data communication network service provider.

8. The system according to claim 7, wherein the information representing the maximum allowable connection times according to the user's age group is predefined by the user.

* * * * *